United States Patent
Storch et al.

(10) Patent No.: US 8,281,486 B2
(45) Date of Patent: Oct. 9, 2012

(54) METHOD FOR MACHINING A GAS TURBINE ROTOR

(75) Inventors: Wilfried Storch, Berlin (DE); Günter Gnirss, Weinheim (DE); Bernd Meixner, Walldorf (DE); Uwe Geissel, Neustadt (DE); Michael Schwaar, Hartmannsdorf (DE)

(73) Assignee: Alstom Technology Ltd., Baden (CH)

( * ) Notice: Subject to any disclaimer, the term of this patent is extended or adjusted under 35 U.S.C. 154(b) by 515 days.

(21) Appl. No.: 12/619,324

(22) Filed: Nov. 16, 2009

(65) Prior Publication Data
US 2010/0162564 A1 Jul. 1, 2010

(30) Foreign Application Priority Data

Nov. 19, 2008 (CH) ........................................ 1805/08

(51) Int. Cl.
*B21D 53/78* (2006.01)
(52) U.S. Cl. .............................. 29/889; 415/117; 416/95
(58) Field of Classification Search ..... 29/889–889.722; 415/117; 416/95, 97 R
See application file for complete search history.

(56) References Cited

U.S. PATENT DOCUMENTS

| | | | | |
|---|---|---|---|---|
| 3,582,230 A * | 6/1971 | Schmidt et al. | ............... | 415/117 |
| 4,047,837 A * | 9/1977 | Hueber et al. | .................. | 416/95 |
| 4,344,738 A * | 8/1982 | Kelly et al. | ...................... | 416/95 |
| 4,672,727 A * | 6/1987 | Field | ........................ | 29/889.721 |
| 4,992,025 A * | 2/1991 | Stroud et al. | ................ | 416/97 R |
| 5,096,379 A * | 3/1992 | Stroud et al. | ................ | 416/97 R |
| 5,957,660 A * | 9/1999 | Evans et al. | ................. | 416/97 R |
| 6,565,318 B1 * | 5/2003 | Tiemann | ..................... | 416/97 R |
| 6,877,936 B2 * | 4/2005 | Linderholm et al. | ......... | 408/1 R |
| 7,019,257 B2 * | 3/2006 | Stevens | .................... | 219/121.71 |
| 7,329,086 B2 | 2/2008 | Wiebe et al. | | |
| 2007/0086884 A1 * | 4/2007 | Wiebe et al. | .................. | 415/115 |

FOREIGN PATENT DOCUMENTS

| | | |
|---|---|---|
| EP | 1705339 A2 | 9/2006 |
| EP | 1862638 A1 | 12/2007 |
| WO | 03006196 A1 | 1/2003 |

* cited by examiner

*Primary Examiner* — David Bryant
*Assistant Examiner* — Jacob Cigna
(74) *Attorney, Agent, or Firm* — Volpe and Koenig, P.C.

(57) ABSTRACT

A method for machining a gas turbine rotor which is provided with a cooling air slot which concentrically extends around the axis of the gas turbine rotor and is supplied with compressed cooling air via axial cooling air holes which at the side lead into the slot base of the cooling air slot, and the opening of which is covered by bridges which are arranged in a distributed manner over the circumference and spaced apart from each other by gaps. A crack-resistant slot shape is achieved without intervention into the configuration of the bridges by a material-removing tool, particularly a milling tool, being lowered in the gaps between the bridges one after the other into the cooling air slot and in this way the slot base of the cooling air slot being machined and widened over the entire circumference.

9 Claims, 4 Drawing Sheets

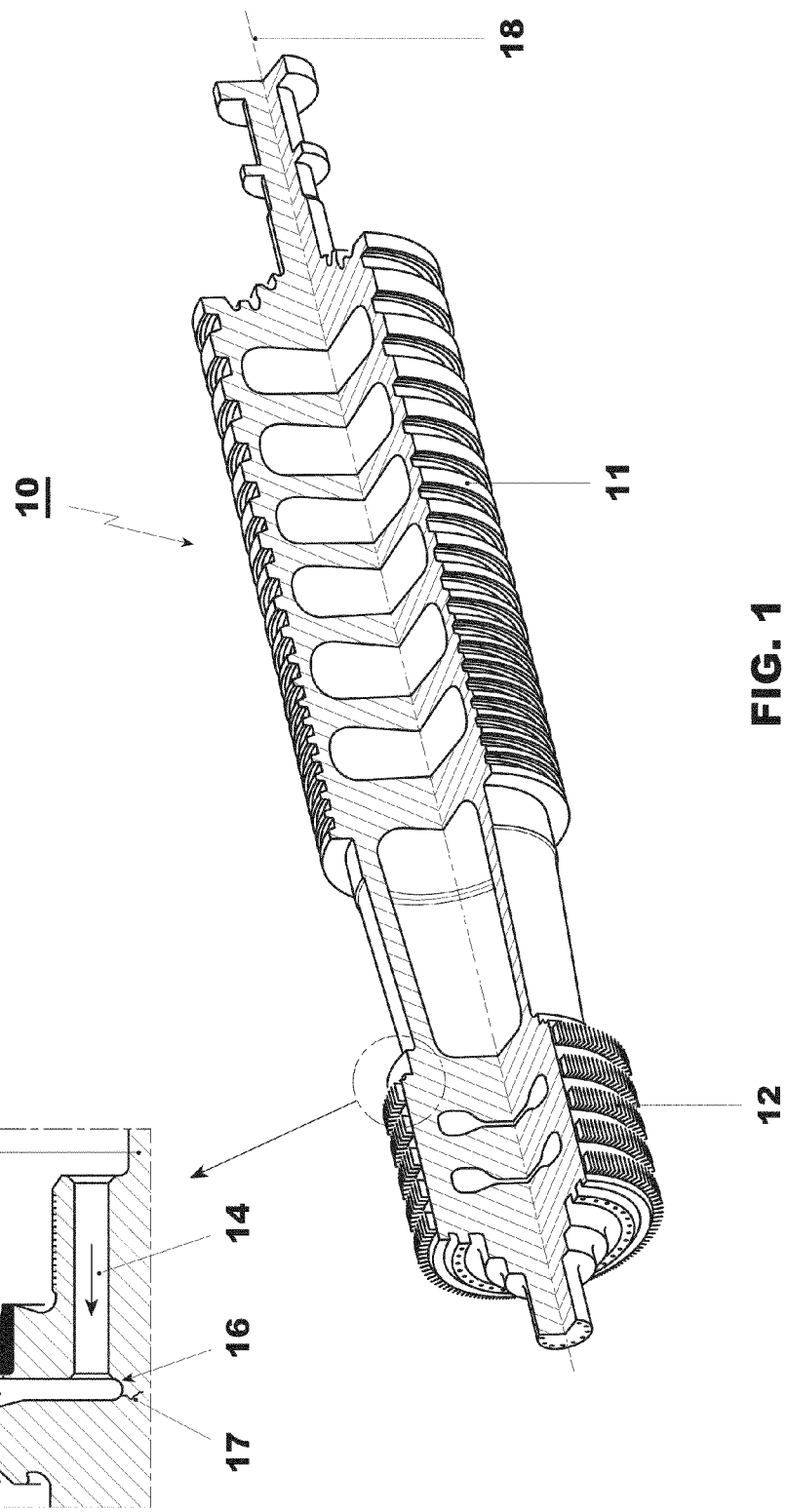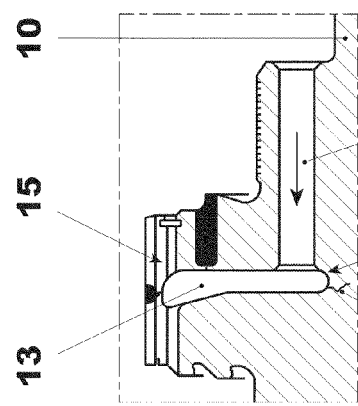

METHOD FOR MACHINING A GAS TURBINE ROTOR

FIELD OF INVENTION

The present invention relates to the field of gas turbines. It refers to a gas turbine rotor with a cooling air slot according to the preamble of claim 1, and also refers to a method for producing such a gas turbine rotor.

BACKGROUND

A gas turbine rotor, as is used for example in the case of types GT11 and GT13 gas turbines of the assignee of the present application, is known from publication EP-A2-1 705 339 (see FIG. 1 there). Such a gas turbine rotor is also shown in FIGS. 1 and 2 of the present application. The gas turbine rotor 10 which is shown in FIG. 1 is constructed from rotor disks which are welded together in a known manner in the direction of the axis 18 and has a compressor section 11 and a turbine section 12, between which the combustion chamber is arranged in the assembled state of the gas turbine. FIG. 3 corresponds to FIG. 5 from EP-A1-1 862 638 and shows an enlarged detail of the turbine section 11 which adjoins the combustion chamber.

In the two sections 11 and 12, a plurality of rows of rotor blades, which are not shown in FIG. 1, are fastened one behind the other in the axial direction. The rotor blades are inserted by correspondingly designed blade roots into encompassing rotor blade slots (37 in FIG. 3). A heat accumulation segment carrier 35 is formed upstream of the first rotor blade slot 37 of the turbine section 11 in the flow direction and has a multiplicity of axial heat accumulation segment slots 15 which are distributed over the circumference. Beneath the heat accumulation segment carrier 35 an encompassing cooling air slot 13 is arranged, which by means of axial cooling air holes 14 (FIG. 2) which are distributed over the circumference is exposed to admission of compressed cooling air from the compressor section of the gas turbine. The cooling air slot 13 is partially covered by bridges 36 which are spaced apart by means of gaps 38 and limit access to the cooling air slot 13 to the gaps 38.

In such gas turbine rotors, encompassing incipient cracks, or cracks 17 (FIG. 2), can occur in the slot base 16 of the cooling air slot 13 depending upon the operating mode and operating time. The incipient cracks grow further with each start-up and after reaching a specific crack depth lead to unstable crack propagation as a result of rotating bending stress and fundamentally impair the component operational safety. Therefore, incipient cracks, especially in the slot base 16 of turbine shafts, must be reliably avoided.

Corresponding strength calculations, which are conducted according to the findings with crack development, prove that the intense operationally induced heat yield during start-up of the plant, in conjunction with the high notch effect of the slot geometry according to the previous design according to FIG. 2, leads to significant alternating plastifications which cause the crack formation.

A slot geometry for newly manufactured rotors therefore takes into consideration the two criteria (heat yield as load shock and notch effect of the old slot geometry) with a wider slot for reducing the air velocity and less sharp transition radii of the slot base to the slot flanks. The previous repair methods are based on constructing the new slot geometry by means of machining out the slot, i.e. by increasing the old slot geometry. In this case, the bridges 36 of the heat accumulation segment carriers 35 are removed over the slot width, which reduces the supporting stability of the remaining bridge sections as a guide for the slot-covering cover segments, or requires the subsequent arrangement of the bridges 36 by means of welded connections and post-heat treatment of the latter.

SUMMARY

The disclosure is directed to a method for machining a gas turbine rotor having a cooling air slot, which concentrically extends around an axis of the gas turbine rotor and is supplied with compressed cooling air via axial cooling air holes, which at the side lead into the slot base of the cooling air slot, and the opening of which is covered by bridges which are arranged in a distributed manner over the circumference and spaced apart from each other by gaps. The method includes lowering a material-removing tool in the gaps between the bridges one after the other into the cooling air slot. The method also includes machining the slot base of the cooling air slot over the entire circumference, and widening, in width the slot base of the cooling air slot as a result of the material removal in such a way that it has a tear-shaped cross-sectional contour with a constriction which lies at the level of the bridges.

BRIEF DESCRIPTION OF THE DRAWINGS

The invention is to be subsequently explained in more detail based on exemplary embodiments in conjunction with the drawings. In the drawings:

FIG. 1 shows in a perspective, partially sectioned view and as known per se gas turbine rotor with a cooling air slot in the turbine section;

FIG. 2 shows an enlarged detail from FIG. 1 with the cooling air slot and an associated cooling air hole;

DETAILED DESCRIPTION OF THE PREFERRED EMBODIMENTS

Introduction to the Embodiments

Figure 3:
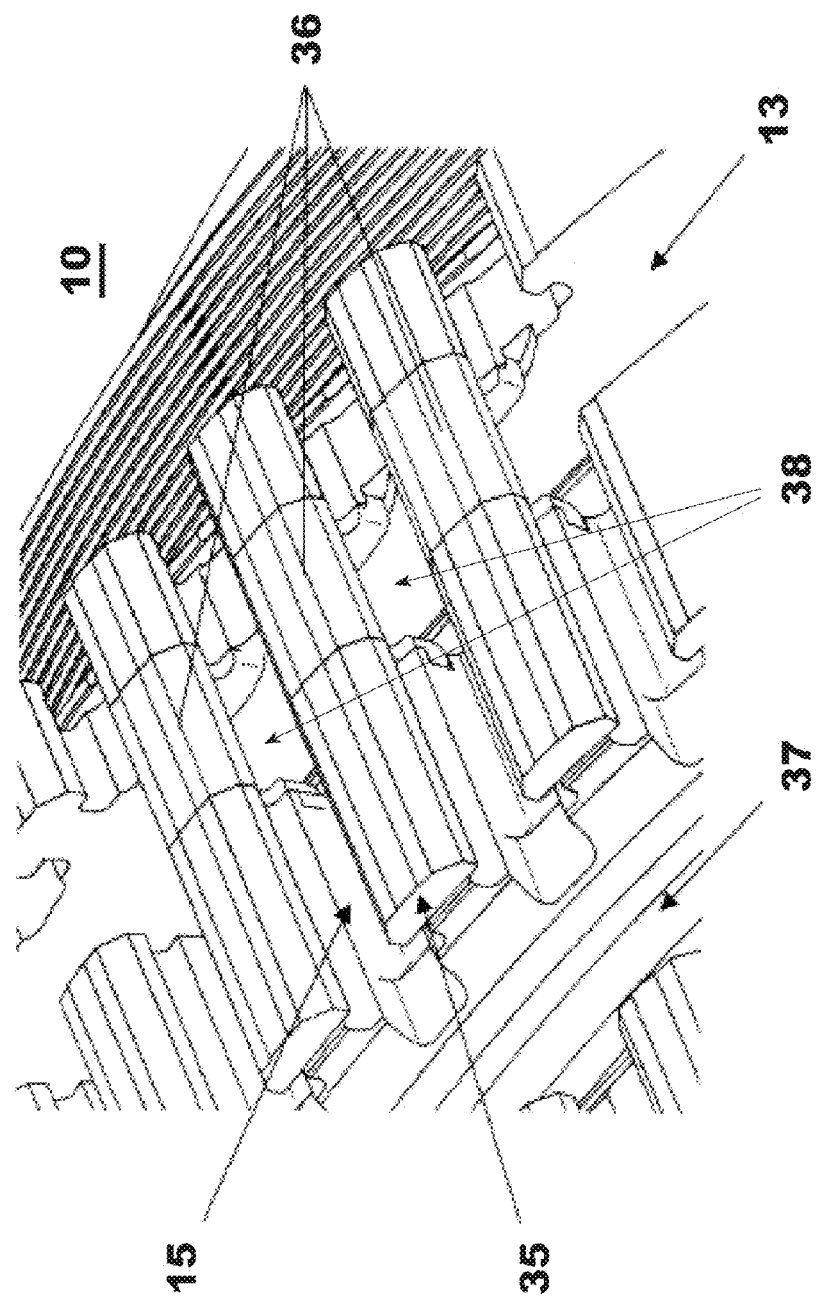
FIG. 3 shows a perspective view of the heat accumulation segment slot of the gas turbine rotor from FIG. 1 with the cooling air slot lying beneath it.

It is therefore an object of the invention to provide a method for machining a gas turbine rotor, with which in the case of crack-prone cooling air slots with partially overlapped bridges the slot base and the slot flanks of the cooling air slots are made free of cracks by forming a new slot contour without welds with subsequent heat treatment in conjunction with the bridge renewal being necessary.

A further object of the invention is based on using a slot shape with which operationally induced component reaction cracks are avoided.

The object is achieved by the entirety of the features of claim 1. It is an essential feature for the solution that a material-removing tool, particularly a milling tool, is lowered in the gaps between the bridges one after the other into the cooling air slot, and in this way the slot base of the cooling air slot is machined over the entire circumference, and that the slot base of the cooling air slot is widened in width as a result of the material removal in such a way that it has a tear-shaped cross-sectional contour with a constriction which lies at the level of the bridges.

According to one development of the invention a specific section of the cooling air slot is machined through each of the gaps, wherein the machining sections which are associated with adjacent gaps overlap.

A further development of the method is that the material-removing tool is moved in a programmed controllable manner in the cooling air slot in a plurality of planes, in that the gas turbine rotor is rotatably supported around its axis, and that once the associated section of the cooling air slot is machined through a gap the material-removing tool is withdrawn from the cooling air slot, the gas turbine rotor is rotated around its axis by a predetermined angle, and the material-removing tool is lowered in a new gap into the cooling air slot for machining.

Another development is that the machining of the slot base is conducted in such a way that the cooling air slot in the slot base has a crack-resistant slot shape with a notch factor of <1.5.

The material-removing tool for machining the slot base is preferably controlled according to a numerical control program (NC-program). In particular, a component-specific cross-sectional final profile of the slot base is determined in this case from the individual operating data of the gas turbine rotor, wherein the cross-sectional final profile can be produced from one or more cross-sectional master profiles by the use of distortion parameters which are determined, a corresponding NC-program for controlling the material-removing tool is associated with each cross-sectional master profile, and the determined distortion parameters are used for adapting the NC-program for the creation of the cross-sectional final profile. The adapting of the NC-program is preferably undertaken by the distortion parameters offline with a post-processor, or online in the machine control system.

If the gas turbine rotor, before the machining in the cooling air slot, has cracks of a specific crack depth, the cross-sectional final profile which is to be achieved as a result of the machining is preferably influenced by the type and state of the cracks.

Detailed Description

Figure 4:
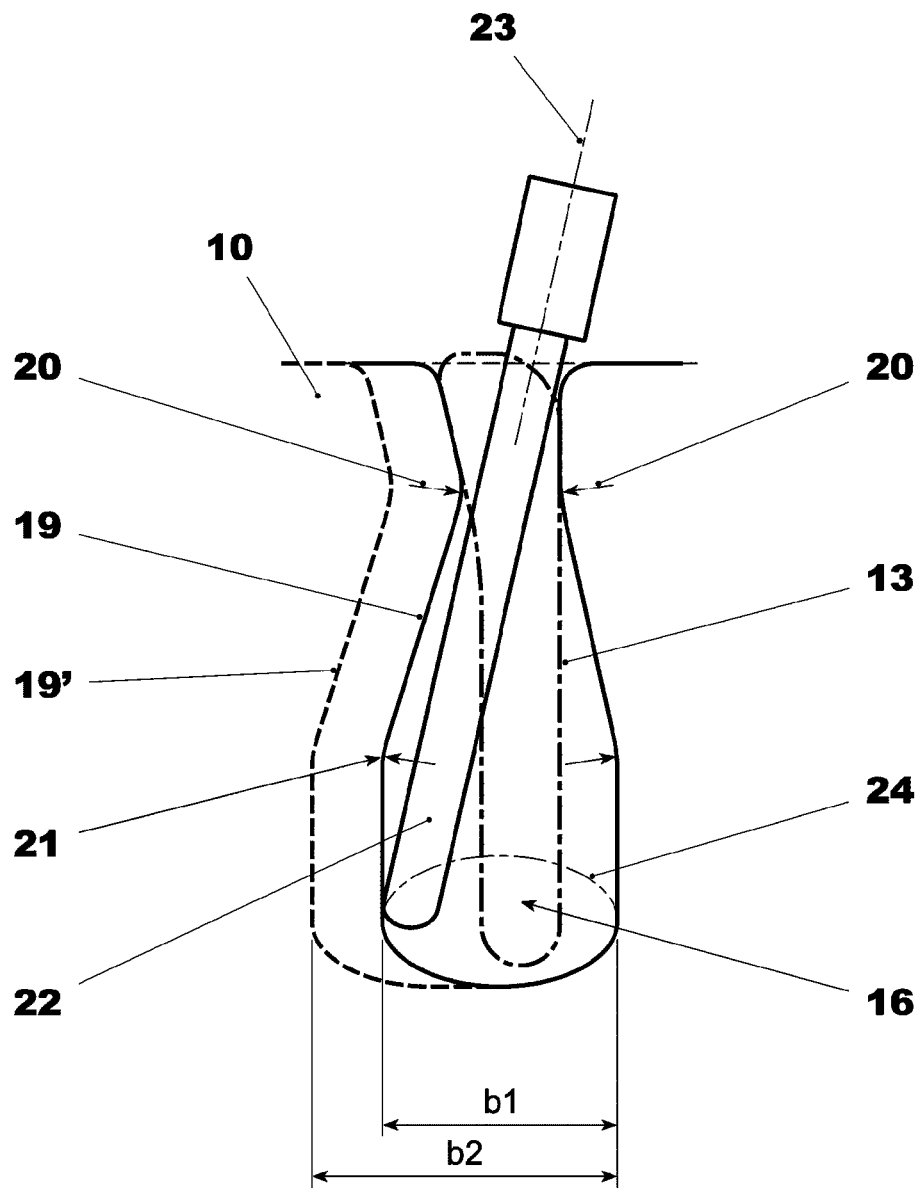
FIG. 4 shows the principle of machining the cooling air slot according to the invention.

In FIG. 4, a cooling air slot 13, as it is also shown in FIG. 2 and as it is before the machining, is drawn in with broken lines. The cooling air slot 13 has a very narrow slot base 16 which leads to the compressed air which flows in through the cooling air holes 14 locally heating the opposing slot flanks in specific operating states and causing thermal stresses in the cooling air slot. It is the aim of the machining method, without intervention into the structure of the bridges 36 (FIG. 3), to widen the cooling air slot which lies beneath them, starting from the cross-sectional contour of the cooling air slot 13 in FIG. 4, so that the harmful effects of the cooling air which flows into the slot can be substantially alleviated.

For this purpose, according to FIG. 4 a material-removing tool, especially with a longish milling body 22, which rotates around an axis 23, is lowered in the gaps 38 between the bridges 36 one after the other into the cooling air slot, and the slot base 16 of the cooling air slot is widened over the entire circumference so that a cross-sectional profile according to the slots which are shown in FIG. 4 as a cooling air slot 19 or cooling air slot 19' results. The milling tool 22 in this case must not only be rotated the axial direction but also in the circumferential direction. As a result of this type of machining, the slot base of the cooling air slot is widened in width (b1, b2) by material removal in such a way that it has the tear-shaped cross-sectional contour which is shown in FIG. 4 with a constriction 20 which lies at the level of the bridges 36. Furthermore, as a result of the rotation in the circumferential direction, a specific circumferential section of the cooling air slot is machined through each of the gaps 38, wherein the machining sections which are associated with adjacent gaps overlap. A uniformly widened slot base cross section over the circumference, as is to be seen in FIG. 4, altogether results in this way despite the geometric limitation during the individual machining steps. The rounded transition between slot flanks and slot base in this case preferably has the shape of an elliptical section (ellipse 24).

The slot shape in this case is determined by a slot width (b1, b2) as a flow path length which alleviates the effect of the air from the compressor, which flows in through the cooling air holes, in such a way that this does not bring about impermissible heat yield into the slot flanks. For this purpose the slot base has a tear-shaped formation with a constriction 20 and a transition 21 between a widened section and a section of constant width with the aim of a notch factor of <1.5 as a design feature of the crack-resistant slot shape. From the individual operating data of each gas turbine rotor the component-specific shape of the slot base is determined by known mathematical methods.

Figure 5:
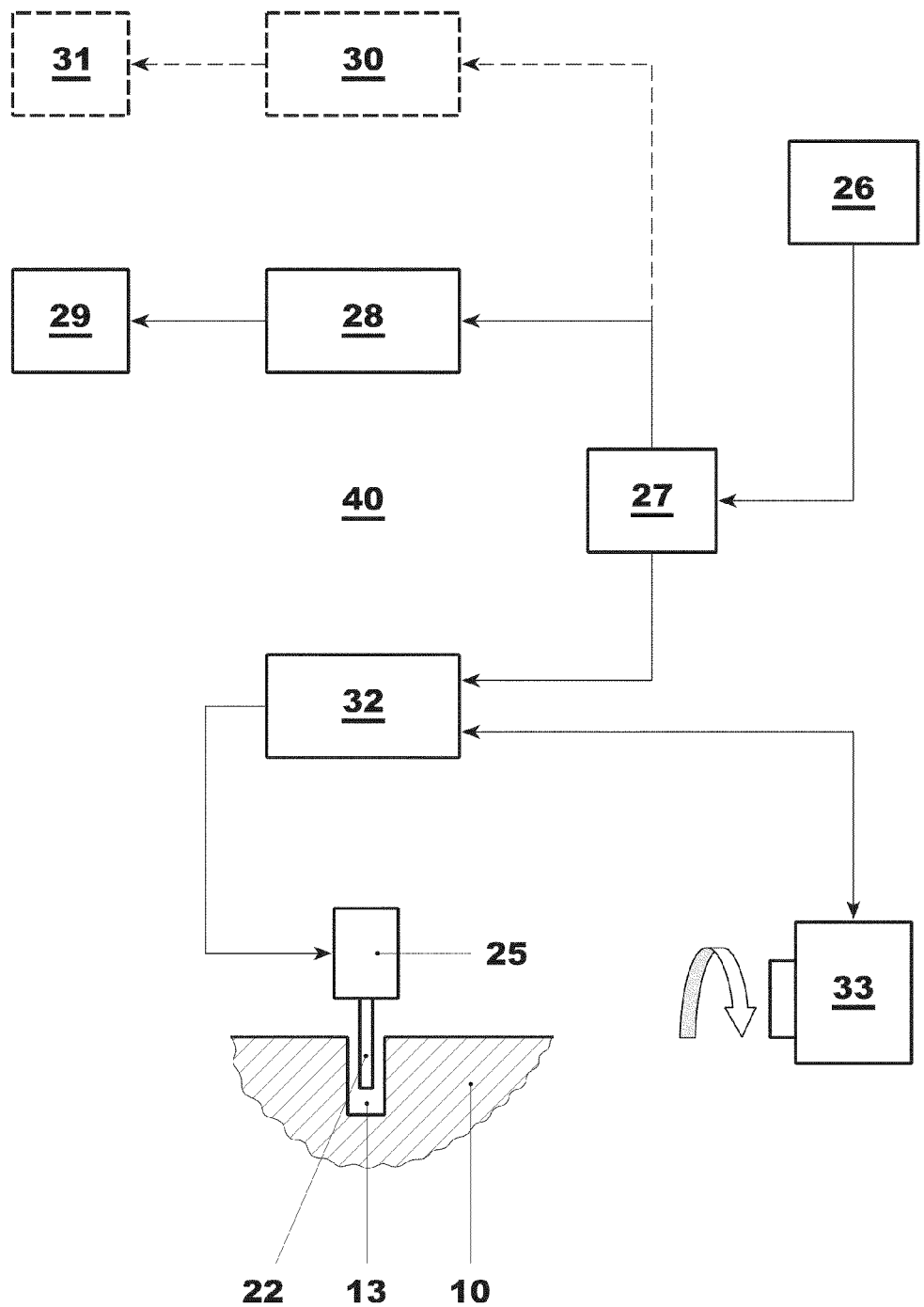
FIG. 5 shows a flow diagram according to an exemplary embodiment of the invention.

The new slot shape is defined according to FIG. 5 by a flow diagram 40 by the current damage state first being determined. Taking into consideration the manner of use of the generator (from operating data 26), a new final profile 29, 31 is generated. For describing the final profile 29, 31, a master profile 28, 30 is used which is distorted with specific distortion parameters 27. A plurality of master profiles 28, 30 can be given from which a profile which is specific for this rotor is selected. An NC-program, which was previously manually generated, is associated with each master profile. The determined distortion parameters 27 are used in order to also adapt the NC-program in an NC-control system 32. Re-programming is therefore dispensed with. The necessary coordinate transformations are converted either offline in a postprocessor or online directly in the machine control system. The NC-control system 32 then controls a milling machine 25 with the milling body 22 which is introduced through the gaps 38 into the cooling air slot 13 of the gas turbine rotor 10 which is to be machined. A rotary drive 33, which can measure the rotational angle at the same time, is connected to the NC-control system 32.

The tool 22 is guided through the gaps 38 between the bridges/support elements 36 which cover the slot opening so that these are not affected by the cutting process. The tool 22, as described above, by a suitable drive unit which is fastened outside the slot, is moved in a programmed controllable manner in the slot in a plurality of planes. By variable equipping of the tool with different cutting bodies or different tool shapes the surface roughness of the machining zones and the surface milled profile can be varied. The drive unit can be an externally seated (above the slot) speed-controllable motor.

The component surface, which is milled in a defined manner in contour and depth, is the aim of the milling process, wherein the surface depth which is to be milled is predetermined by the crack depth which is determined before or during the milling process, or by a new slot shape configuration. The tool in this case machines a slot surface which is delimited as a result of the movement space of the window between the bridges over the slot. In order to free the entire slot circumference of cracks by milling by metal cutting, a stepwise repositioning of the construction of rotor and tool is carried out until the slot surfaces which are freed of cracks or are to be newly contoured are covered.

List of Designations

10 Gas turbine rotor
11 Compressor section
12 Turbine section

13 Cooling air slot
14 Cooling air hole
15 Heat accumulation segment slot
16 Slot base
17 Crack
18 Axis (gas turbine rotor)
19, 19' Cooling air slot (machined)
20 Constriction
21 Transition
22 Milling body
23 Axis (milling spindle)
24 Ellipse
25 Milling machine
26 Operating data
27 Distortion parameter
28, 30 Master profile
29, 31 Final profile
32 NC-control system
33 Rotary drive (with rotational angle measurement)
35 Heat accumulation segment carrier
36 Bridge
37 Rotor blade slot
38 Gap
40 Flow diagram
b1, b2 Width

What is claimed is:

1. A method for machining a gas turbine rotor (10) having a cooling air slot (19, 19'), which concentrically extends around an axis (18) of the gas turbine rotor (10) and is supplied with compressed cooling air via axial cooling air holes (14), which at a side of the gas turbine rotor lead into a slot base (16) of the cooling air slot (19, 19'), and an opening of the cooling air slot is covered by bridges (36) which are arranged in a distributed manner over a circumference of the gas turbine rotor and spaced apart from each other by gaps (38), the method comprising: lowering a material-removing tool (22, 25) in the gaps (38) between the bridges (36) one after the other into the cooling air slot (19, 19'); machining the slot base (16) of the cooling air slot (19, 19') over the entire circumference of the gas turbine rotor, and widening, in width (b1, b2), the slot base (16) of the cooling air slot (19, 19') as a result of the material removal in such a way that the slot base has a tear-shaped cross-sectional contour with a constriction (20) which lies at a level of the bridges (36).

2. The method as claimed in claim 1, wherein a specific section of the cooling air slot (19, 19') is machined through each of the gaps (38), and the machined sections which are associated with adjacent gaps overlap.

3. The method as claimed in claim 1, wherein the material-removing tool (22, 25) is moved in a programmed controllable manner in the cooling air slot (19, 19') in a plurality of planes, the gas turbine rotor (10) is rotatably supported around its axis (18), and once an associated section of the cooling air slot (19, 19') is machined through a gap (38), the material-removing tool (22, 25) is withdrawn from the cooling air slot (19, 19'), the gas turbine rotor (10) is rotated around its axis (18) by a predetermined angle, and the material-removing tool (22, 25) is lowered in a new gap (38) into the cooling air slot (19, 19') for machining.

4. The method as claimed in claim 1, wherein the machining of the slot base (16) is conducted in such a way that the cooling air slot (19, 19') in the slot base (16) has a crack-resistant slot shape with a notch factor of <1.5.

5. The method as claimed in claim 1, wherein the material-removing tool (22, 25) is controlled according to an NC-program for machining the slot base (16).

6. The method as claimed in claim 5, wherein a component-specific cross-sectional final profile of the slot base (16) is determined from individual operating data of the gas turbine rotor (10), the cross-sectional final profile can be created from one or more cross-sectional master profiles by the use of distortion parameters which are determined, a corresponding NC-program for controlling the material-removing tool (22, 25) is associated with each cross-sectional master profile, and in that the determined distortion parameters are used for adapting the NC-program for the creation of the cross-sectional final profile.

7. The method as claimed in claim 6, wherein the adapting of the NC-program is undertaken by the distortion parameters offline with a postprocessor.

8. The method as claimed in claim 6, wherein the adapting of the NC-program is undertaken by the distortion parameters online in the machine control system.

9. The method as claimed in claim 6, wherein the gas turbine rotor (10) before the machining in the cooling air slot (19, 19') has cracks (17) of a specific crack depth, and the cross-sectional final profile which is to be achieved as a result of the machining is influenced by the type and state of the cracks (17).

* * * * *